US005419847A

United States Patent [19]

Showell et al.

[11] Patent Number: 5,419,847

[45] Date of Patent: May 30, 1995

[54] TRANSLUCENT, ISOTROPIC AQUEOUS LIQUID BLEACH COMPOSITION

[75] Inventors: Michael S. Showell; Josephine L. Kong-Chan; Philip G. Sliva; Kermit W. Kinne, all of Cincinnati, Ohio; Kathleen B. Hunter, Villa Hills, Ky.

[73] Assignee: The Procter & Gamble Company, Cincinnati, Ohio

[21] Appl. No.: 61,796

[22] Filed: May 13, 1993

[51] Int. Cl.[6] .......... C11D 7/54; C01B 15/037

[52] U.S. Cl. .......... 252/100; 8/111; 8/137; 252/102; 252/186.28; 252/186.29; 252/186.38; 252/186.43

[58] Field of Search .......... 252/95, 100, 186.28, 252/186.29, 186.38, 186.43

[56] References Cited

U.S. PATENT DOCUMENTS

| | | | |
|---|---|---|---|
| 2,838,459 | 6/1958 | Sprout, Jr. | 252/186 |
| 3,192,255 | 6/1965 | Cann | 260/502 |
| 3,442,937 | 5/1969 | Sennewald et al. | 260/502 |
| 3,956,159 | 5/1976 | Jones | 252/104 |
| 4,126,573 | 11/1978 | Johnston | 252/99 |
| 4,367,156 | 1/1983 | Diehl | 252/102 |
| 4,486,327 | 12/1984 | Murphy et al. | 252/94 |
| 4,497,725 | 2/1985 | Smith et al. | 252/102 |
| 4,536,314 | 8/1985 | Hardy et al. | 252/102 |
| 4,539,130 | 9/1985 | Thompson et al. | 252/94 |
| 4,541,944 | 9/1985 | Sanderson | 252/95 |
| 4,606,838 | 8/1986 | Burns | 252/94 |
| 4,681,592 | 7/1987 | Hardy et al. | 8/111 |
| 4,758,369 | 7/1988 | Dryoff et al. | 252/94 |
| 4,770,666 | 9/1988 | Clauss | 8/111 |
| 4,772,290 | 9/1988 | Mitchell et al. | 8/102 |
| 4,822,510 | 4/1989 | Madison et al. | 252/95 |
| 4,824,591 | 4/1989 | Dryoff et al. | 252/94 |
| 4,900,468 | 2/1990 | Mitchell et al. | 252/95 |
| 4,900,469 | 2/1990 | Farr et al. | 252/96 |
| 4,929,377 | 5/1990 | Emmons et al. | 251/100 |
| 4,983,315 | 1/1991 | Glogowski et al. | 252/102 |
| 5,002,682 | 3/1991 | Bragg et al. | 252/99 |
| 5,004,558 | 4/1991 | Dyroff et al. | 252/95 |
| 5,039,447 | 8/1991 | Reuben | 252/186.26 |
| 5,055,218 | 10/1991 | Getty et al. | 252/94 |
| 5,106,528 | 4/1992 | Francis et al. | 252/186.23 |
| 5,160,655 | 11/1992 | Donker et al. | 252/95 |
| 5,174,927 | 12/1992 | Honsa | 252/543 |

*Primary Examiner*—Gary Geist
*Assistant Examiner*—Joseph D. Anthony
*Attorney, Agent, or Firm*—Jacobus C. Rasser; Jerry J. Yetter; Michael D. Jones

[57] ABSTRACT

The present invention provides an aqueous liquid bleach composition which remains stable over an extended period of time. The liquid bleach is easily pourable since it has a relatively low viscosity. The liquid bleach generally comprises (a) from about 1% to about 25% by weight of a water-soluble bleach activator; (b) from about 0.1% to about 10% by weight of hydrogen peroxide; (c) from about 1% to about 20% by weight of a phase stabilizer; (d) from about 0.001% to about 2% by weight of a chelating agent; and (e) the balance water. The liquid bleach composition is isotropic, translucent and has a viscosity of less than about 500 cps.

14 Claims, No Drawings

TRANSLUCENT, ISOTROPIC AQUEOUS LIQUID BLEACH COMPOSITION

FIELD OF THE INVENTION

The present invention generally relates to liquid bleach compositions and more particularly, to a stable, aqueous liquid bleach composition comprising a bleach activator, hydrogen peroxide and a stabilizing system. The liquid bleach is isotropic, translucent and has a viscosity of less than 500 cps, properties which are currently desired by users of liquid bleaches.

BACKGROUND OF THE INVENTION

There are numerous categories of bleaches which are well known in the art. Of the wide variety currently available, chlorine releasing bleaches, inorganic peroxygen bleaches, and organic peroxyacid bleaches are the most common. The chlorine releasing bleaches have certain disadvantages associated with their use such as, for example, their tendency to weaken or degrade fabrics, a tendency to react with other components in the composition in which they are present and their general propensity for fading colors in many dyed fabrics. Additionally, under several bleaching conditions chlorine bleaches cause yellowing of certain synthetic fabrics.

While inorganic peroxygen bleaches overcome many of the disadvantages found with chlorine bleaches, they have limitations on use in that they must be used at relatively high temperatures, such as 85° C. or higher. This drawback becomes significant in light of the modern trend of using lower wash temperatures which are generally less than about 60° C. in order to reduce energy costs and prolong the life of the fabric. As a consequence, it is generally necessary to improve the low temperature performances of inorganic peroxygen bleaches through the addition of peroxygen bleach activators also known as peroxyacid precursors.

In the past, ninny have also attempted to use peroxyacid bleaches, either alone or in combination with a bleach activator, as an alternative to the chlorine and inorganic peroxygen bleaches described above. Unfortunately, upon dissolution in water, peroxyacid bleaches such as peroxycarboxylic acids lose their active oxygen and convert to carboxylic acid. Thus, those in the past have found it difficult to formulate stable liquid bleaching compositions.

Many, however, have attempted to stabilize the peroxyacids in their compositions by various means such as encapsulation or incorporation of stabilizing systems. Representative of such attempts include Hardy et al, U.S. Pat. No. 4,536,314; Thompson et al, U.S. Pat. No. 4,539,130; and Burns, U.S. Pat. No. 4,606,838, all of which are commonly assigned. All of these patents are directed to bleaching compositions containing peroxyacids and bleach activators. While the bleaching compositions disclosed therein are suitable for their intended use, they only contemplate compositions in "granular" form as opposed to a stable "aqueous liquid" bleach. Past attempts in this regard, however, have found that it is extremely difficult to formulate a stable aqueous bleach solution based on peroxyacid and/or the combination of a bleach activator and a peroxygen bleach. In addition to the degradation to carboxylic acid problem discussed previously, bleach activator/hydrogen peroxide systems have also exhibited stability problems arising from extraneous reactions with the conventional components of liquid bleaches including solvents, pH adjusting agents, surfactants and soil suspending agents.

To alleviate these problems, attempts have been made to maintain peroxyacids and bleach activators in a suspension or slurry as an alternative to a homogenous liquid bleach system. By way of example, Reuben, U.S. Pat. No. 5,039,447 (Monsanto Company), discloses a pourable sulfone peracid bleaching composition. The composition is an aqueous stable liquid bleach comprising sulfone peroxycarboxylic acid and a stabilizing system including anionic and nonionic surfactants and a salt stabilizer such as sodium sulfate. While this particular bleaching composition may be effective, it has a cloudy appearance not particularly aesthetically pleasing to users. Moreover, because the composition contains the peroxyacid as a solid suspension or slurry, there is a strong likelihood of the solid phase separating from the liquid phase, especially over extended storage periods and across varying temperature conditions. Additionally, the presence of a solid suspension in the bleaching composition increases the viscosity, thereby rendering it less pourable, a feature not especially convenient for users.

Accordingly, there is a continuing need in the art for a stable aqueous liquid bleach composition which can be used as an additive. There is also a need in the art for such a stable liquid bleach composition which is isotropic or in a single phase and is translucent in appearance. Further, it would be desirable to have a liquid bleach composition having a lower viscosity so as to facilitate pouring of the bleach into the washing solution.

SUMMARY OF THE INVENTION

The present invention meets the needs in the art identified above by providing a stable aqueous liquid bleach composition which remains isotropic and translucent over an extended period of time and across a wide range of temperatures. The liquid bleach is easily pourable as its viscosity is relatively low, i.e. substantially less than about 500 cps. Such features render the instant liquid bleach composition very convenient for use by consumers. The liquid bleach composition strikes an optimum balance of bleach activator and peroxygen bleach formulated at acidic pHs such that the composition can be stored in an aqueous media over lengthy storage periods which vary in temperature. The bleach activators in past liquid bleaches would be expected to convert entirely to non-active carboxylic acid or the like.

In accordance with one aspect of the invention, a stable aqueous liquid bleach is provided. The liquid bleach generally comprises: (a) from about 1% to about 25% by weight off water-soluble bleach activator; (b) from about 0.1% to about 10% by weight of hydrogen peroxide; (c) from about 1% to about 20% by weight off phase stabilizer; (d) from about 0.001% to about 1% by weight of a chelating agent; and (e) the balance water. The liquid bleach composition is isotropic, translucent and has a viscosity of substantially less than about 500 cps. Extended shelf-life can be achieved by maintaining the pH of the liquid bleach composition in a range from about 3.5 to about 4.5.

Accordingly, it is an object of the invention to provide a stable aqueous liquid bleach composition which is isotropic and translucent in appearance over an extended period of time. It is also an object of the invention to provide a liquid bleach composition having a lower viscosity so as to facilitate pouring of the bleach into the washing solution. These and other objects, features and attendant advantages of the present invention will become apparent to those skilled in the art from a reading of the following detailed description of the preferred embodiment and the appended claims.

DETAILED DESCRIPTION OF THE PREFERRED EMBODIMENT

In accordance with the invention, it has now been found that a stable aqueous liquid bleach composition is surprisingly formed when a water-soluble bleach activator, hydrogen peroxide or source thereof, phase stabilizer(s) and chelating agent(s) are combined in relative proportions specified hereinafter. The resulting liquid bleach composition is isotopic and translucent, properties which are present even after extended storage times. As used herein, the term "isotropic" indicates a single continuous phase, e.g. a liquid. A slurry or liquid having a solid bleach or bleach activator suspended therein would not fall within the scope of isotropic as used herein. As used herein, the term "translucent" means aesthetically clear or transparent. The liquid bleach composition of the invention also has a viscosity substantially lower than typical solid-suspended liquid bleaches, a feature is particularly advantageous for users.

The stable aqueous liquid bleach composition of the invention preferably comprises from about 1% to about 25%, more preferably from about 3% to about 12%, most preferably from about 5% to about 10% by weight of a water-soluble bleach activator. Further, the liquid bleach composition includes from about 0.1% to about 10%, more preferably from about 0.3% to about 7%, most preferably from about 0.5% to about 5% by weight of hydrogen peroxide or delivered from a source thereof. Also included is from about 1% to about 20%, more preferably from about 5% to about 15%, most preferably from about 7% to about 10% by weight of a phase stabilizer and from about 0.001% to about 2%, more preferably from about 0.05% to about 1%, most preferably from about 0.1% to about 0.8% by weight of a chelating agent. The balance of the liquid bleach composition is water.

The Bleach Activator

The bleaching mechanism generally, and the surface bleaching mechanism in particular, in the washing solution are not completely understood. While not intending to be limited by theory, however, it is believed that the bleach activator undergoes nucleophilic attack by a perhydroxide anion, for example from aqueous hydrogen peroxide, to form a percarboxylic acid. This reaction is commonly referenced in the art as perhydrolysis.

A second species present in the washing solution is the diacylperoxide (also referred to herein as "DAP"). It is imperative that some DAP production is present in order to improve bleaching of specific stains such as, for example, those stains caused by spaghetti sauce or barbecue sauce. The peroxyacid acids are particularly useful for removing dingy soils from textiles. As used herein, "dingy soils" are those which have built up on textiles after numerous cycles of usage and washing and thus, cause the white textile to have a gray or yellow tint. Accordingly, the bleaching mechanism herein preferably produces an effective amount of peroxyacid and DAP to bleach both dingy stains as well as stains resulting from spaghetti and the like.

Further, it is believed that bleach activators within the scope of the invention render the peroxygen bleaches more efficient even at bleach solution temperatures wherein the bleach activators are not necessary to activate the bleach, for example at temperatures above 60° C. As a consequence, less peroxygen bleach is required to obtain the same level of surface bleaching performance as compared with peroxygen bleach alone.

In a preferred embodiment, the bleach activator used in the liquid bleach composition has the general formula

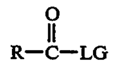

wherein R is an alkyl group, linear or branched, containing from about 1 to 11 carbon atoms and LG is a suitable leaving group. As used herein, a "leaving group" is any group that is displaced from the bleach activator as consequence of nucleophilic attack on the bleach activator by the perhydroxide anion, i.e. perhydrolysis reaction.

Generally, a suitable leaving group is electrophilic and is stable such that the rate of the reverse reaction is negligible. This facilitates the nucleophilic attack by the perhydroxide anion. The leaving group must also be sufficiently reactive for the reaction to occur within the optimum time frame, for example during the wash cycle. However, if the leaving group is too reactive, the bleach activator will be difficult to stabilize. In the past, those skilled in the an have not been successful in formulating an aqueous liquid bleach having the desired stability for a practical shelf-life.

These characteristics are generally paralleled by the $pK_a$ of the conjugate acid of the leaving group, although exceptions to this convention are known. The conjugate acid of the leaving group in accordance with the present invention preferably has a $pK_a$ in a range from about 4 to about 13, more preferably from about 6 to about 11, and most preferably from about 8 to about 11.

Preferably, the leaving group has the formula

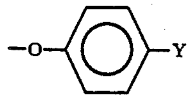

wherein Y is selected from the group consisting of $SO_3^-M^+$, $COO^-M^+$, $SO_4^-M^+$, $PO_4^-M^+$, $PO_3^-M^+$, $(N^+R_3^2)X^-$ and $O \leftarrow N(R_2^2)$, M is a cation and X is an anion, both of which provide solubility to the bleach activator, and $R^2$ is an alkyl chain containing from about 1 to about 4 carbon atoms or H. In accordance with the present invention, M is preferably an alkali metal, with sodium being most preferred. Preferably, X is a hydroxide, methylsulfate or acetate anion.

Other suitable leaving groups have the following formulas

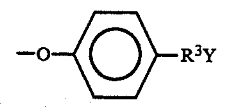

-continued

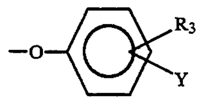

wherein Y is the same as described above and $R^3$ is an alkyl chain containing from about 1 to about 8 carbon atoms, H or $R^2$.

While numerous bleach activators as described above are suitable for use in the present liquid bleach composition, a preferred bleach activator has the formula

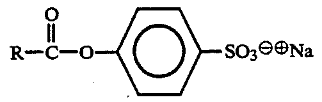

wherein R is an alkyl chain, linear or branched, containing from about 1 to about 11 carbon atoms. Most preferably, the bleach activator has the formula

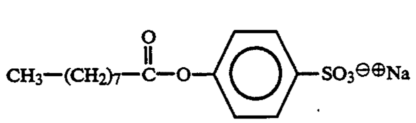

which is also referred to as sodium n-nonyloxybenzene sulfonate (hereinafter referred to as "NOBS"). This bleach activator and those described previously may be readily synthesized by well known reaction schemes or purchased commercially, neither of which is more preferred. Those skilled in the art will appreciate that other bleach activators beyond those described herein which are readily water-soluble can be used in the present liquid bleach composition without departing from the scope of the invention.

The Peroxygen Bleach

The stable aqueous liquid bleach composition of the invention also includes a peroxygen bleach, most preferably hydrogen peroxide in the relative proportions disclosed herein. It is also possible to incorporate peroxygen bleaching compounds which are capable of yielding the desired proportion of hydrogen peroxide in the aqueous liquid bleach. Such compounds are well known in the art and can include alkali metal peroxides, organic peroxide bleaching compounds such as urea peroxide, and inorganic persalt bleaching compounds such as alkali metal perorates, percarbonates, perphosphates and the like. Of course mixtures of the aforementioned compounds can also be used. Preferred peroxygen bleaching compounds include sodium perborate, commercially available in the form of mono-, tri- and tetrahydrates, sodium carbonate peroxyhydrate, sodium pyrophosphate peroxyhydratc, urea peroxyhydrate, and sodium peroxide.

Previous aqueous bleaches were two-phase one of which contained a peroxyacid in the form of a solid sometimes encapsulated to prevent the undersirable conversion to carboxylic acid when contacted with the water solvent. Typically, the second phase would be in liquid form, e.g. water. The result was a slurry which was not translucent and isotropic. The aqueous liquid bleach of the instant invention achieves its superior properties, in part, by maintaining specific ratios of a bleach activator to a peroxygen bleach (preferably hydrogen peroxide). To that end, in the most preferred embodiment of the invention the molar ratio of hydrogen peroxide to the bleach activator is in a range from about 15:1 to about 1:2, and most preferably from about 10:1 to about 1:1. Such ratios are reflected in the relative proportions of percentages by weight described herein.

Chelating Agent

The stable aqueous liquid bleach is isotropic, translucent and storage stable in an aqueous media, in pan, due to its effective use of a phase stabilizer and a chelating agent. Without intending to be limited by theory, it is believed that the benefit of chelating agents is due, at least partially, to their exceptional ability to remove heavy metal ions from the aqueous solutions in which they are contained. Since the peroxyacid compounds formed by the perhydrolysis of the bleach activator are subject to the loss of available oxygen when contacted with heavy metals such as iron and manganese, it is preferable to include at least one chelating agent in the liquid bleach composition of the invention.

Representative examples of suitable chelants for use herein include but are not limited to carboxylates, such as ethylene diamine tetraacetate (EDTA) and diethylene triamine pentaacetate (DTPA); polyhosphates, such as sodium acid pyrophosphate (SAPP), tetrasodium pyrophosphate (TSPP), and sodium tripolyphosphate (STPP); phosphonates, such as ethylhydroxydiphosphonate (Dequest ®2010, commericially available from Monsanto Co.) as well as other sequestering agents sold under the Dequest ® trade name; citric acid; dipicolinic acid (2,6 pyridinedicarboxylic acid); picolinic acid; 8-hydroxyquinoline; and combinations thereof.

Furthermore, the chelating agent can be any of those described in Sennewald et al, U.S. Pat. No. 3,442,937, Sprout, Jr., U.S. Pat. No. 2,838,459 and Cann, U.S. Pat. No. 3,192,255, all of which are incorporated herein by reference. Preferred chelating agents for use in the present liquid bleach composition are ethylhydroxydiphosphonate, dipicolinic acid (2,6 pyridinedicarboxylic acid), and citric acid.

Nonionic Surfactant

The liquid bleach composition of the invention also includes a nonionic surfactant as a phase stabilizer to facilitate maintenance of its continuous isotropic state. To this end, several nonionic surfactants have been found to be particularly useful. Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 20 moles of ethylene oxide per mole of alkyl phenol.

Other nonionic surfactants which function as suitable phase stabilizers are the water-soluble and water-dispersible condensation products of aliphatic alcohols containing from 8 to 22 carbon atoms, in either straight chain or branched configuration, with from 3 to 20 moles of ethylene oxide per mole of alcohol. Still other nonionic surfactants include semi-polar nonionic surfactants such as water-soluble amine oxides containing one alkyl moiety of from abut 10 to 18 carbon atoms and two moieties selected from the group of alkyl and hydroxyalkyl moieties of from about 1 to about 3 carbon atoms; water-soluble phosphine oxides containing one alkyl moiety of about 10 to 18 carbon atoms and two moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred nonionic surfactants are of the formula $R^1(OC_2H_4)_nOH$, wherein $R^1$ is a $C_8$–$C_{16}$ alkyl group or a $C_8$–$C_{12}$ alkyl phenyl group, and n is from 3 to about 20. Particularly preferred are condensation products of $C_9$–$C_{15}$ alcohols with from about 5 to about 20 moles of ethylene oxide per mole of alcohol. The most preferred nonionic of this type is an alkyl ethoxylate having front about 9 to 11 carbon atoms and an average degree of ethoxylation of about 10 which is available from Shell Oil Co. under the product name Neodol 91-10.

With the aforementioned chelating agent and phase stabilizer, i.e. nonionic surfactant, the stable aqueous liquid bleach composition in accordance with the invention can be produced. The resulting liquid bleach composition has a relatively low viscosity which renders it more pourable and therefore, more convenient for users especially when the composition is used as an additive. The viscosity of the present liquid bleach is preferably in a range from about 10 to about 500 cps, more preferably from about 10 to about 300 cps, and most preferably from about 10 to about 100 cps.

pH Adjusting Agent

It has been found that optimum stability and performance is achieved when the aqueous liquid bleach has a pH in range from about 2 lo about 7, more preferably from about 3 to about 5, and most preferably from about 3.5 to about 4.5. For purposes of achieving such pH's in the present stable aqueous liquid bleach composition, a pH adjusting agent may optionally be included. It is a well known technique to use pH adjusting agents to alter aqueous solutions such as the present liquid bleach, to the desired pH.

Typical pH adjusting agents can be either of the acid type or of the base type. Acidic pH adjusting agents are designed to compensate for the presence of other highly alkaline materials and include organic and inorganic acids, acid mixtures and acid salts. Non-limiting examples of such acidic pH adjusting agents include citric acid, glycolic acid, phosphoric acid, lauric acid and mixtures thereof. Representative examples of alkaline pH adjusting agents include but not limited to sodium hydroxide, salts of phosphates, citrates and mixtures thereof.

In addition to the materials described above, the liquid bleach may also include perfumes, colorants, brighteners, viscosity adjusters such as thickeners, and other conventional components typically used in detergent compositions, if compatible.

The liquid bleach of the invention can be produced by a wide variety of processes. While not intending to be limiting, the most economical and easiest manner in which the liquid bleach can be produced is to simply dissolve all of the preferred components in water. As those skilled in the art will appreciate, it may be desirable to dissolve certain components in the water before others. This offers an inexpensive way to produce the present liquid bleach composition without the use of sophisticated processing apparatus.

In accordance with another aspect of the invention, a method of bleaching fabrics comprises the step of contacting fabrics with a diluted aqueous solution of the liquid composition of the invention. Another method contemplated by the invention involves laundering soiled clothes, using the liquid bleach composition as an additive. The method comprises the steps of contacting clothes, fabrics and the like with an effective amount of a detergent composition in combination with an effective amount of a stable aqueous liquid bleach composition. In practicing these methods, the stable aqueous liquid bleach compositions of the present invention can be used in widely varying concentrations depending on the particular application involved but are generally utilized in an amount sufficient to provide from about 1.0 ppm to about 50 ppm available oxygen from peracid or DAP in solution.

In order to make the present invention more readily understood, reference is made to the following examples, which are intended to be illustrative only and not intended to be limiting in scope.

EXAMPLE I

This Example illustrates several liquid bleach compositions in accordance with the invention, all of which are made by the general process described hereinafter. The desired amount of a chelating agent is added to a beaker of water, after which the resulting solution is stirred until the chelating agent is completely dissolved. A phase stabilizer is added to the solution while it is being continuously stirred. Thereafter, the bleach activator and optionally an additional chelating agent is dissolved in the solution. The pH of the solution is adjusted to about 4.0 with an alkaline adjusting agent such as sodium hydroxide.

The following translucent, stable aqueous liquid bleach compositions (Samples A–F) are made as described above, all amounts being expressed as percentages by weight.

TABLE I

| | Samples | | | | | |
|---|---|---|---|---|---|---|
| | A | B | C | D | E | F |
| Water | 81.28 | 81.86 | 82.44 | 83.02 | 78.60 | 83.98 |
| Neodol 91-10[1] | 10.00 | 10.00 | 10.00 | 10.00 | 10.00 | 10.00 |
| Dipicolinic Acid[2] | 0.05 | 0.05 | 0.05 | 0.05 | 0.05 | 0.05 |
| Dequest 2010[3] | 0.05 | 0.05 | 0.05 | 0.05 | 0.05 | 0.05 |
| NOBS | 5.80 | 5.80 | 5.80 | 5.80 | 7.71 | 3.87 |
| Citric Acid | 0.50 | 0.50 | 0.50 | 0.50 | 0.50 | 0.50 |
| NaOH | to pH 4 | to pH 4 | to pH 4 | to pH 4 | to pH 4 | to pH 4 |
| Hydrogen Peroxide | 2.32 | 1.74 | 1.16 | 0.58 | 3.09 | 1.55 |

1. alkyl ethoxylate available from The Shell Oil Company.
2. 2,6-pyridine dicarboxylic acid commercially available from Aldrich Chemical Co.
3. ethylhydroxydiphosphonate commericially available from Monsanto Co.

EXAMPLE II

This Example illustrates the superior phase stability achieved by samples A–F of Example I, all of which are in accordance with the invention. Each sample is placed into a sealed 4 ounce glass jar which is stored in a constant temperature room (38° C. or 100° F.) for 2 weeks. The phase stability of each sample is observed until failure or phase instability. Failure or phase instability is determined by observation of haziness or other indication of phase separation.

TABLE II

| | Samples (Days to Phase Stability Failed) | | | | | | |
|---|---|---|---|---|---|---|---|
| Temperature (°C.) | A | B | C | D | E | F | G |
| 21 (70° F.) | >35 | >35 | >35 | >35 | >40 | >40 | 5 |

TABLE II-continued

| | Samples (Days to Phase Stability Failed) | | | | | | |
|---|---|---|---|---|---|---|---|
| Temperature (°C.) | A | B | C | D | E | F | G |
| 38 (100° F.) | >35 | >35 | >35 | >35 | >40 | >40 | NA |
| 49 (120° F.) | >35 | >35 | >35 | >35 | >40 | >40 | NA |

The results illustrate the superior phase stability of samples A–F over sample G which is outside the scope of the invention. Sample G contains only water (89.5%), NOBS (5%), citric acid (0.5%), NaOH (to pH 4) and hydrogen peroxide (5%). Thus, sample G clearly has inferior phase stability since it does not include a nonionic surfactant phase stabilizer pursuant to the present invention.

EXAMPLE III

This Example illustrates the superior performance of the liquid bleach samples A–F. A series of panelist tests as described in detail below are conducted. The results are presented in Table III. The performance of samples A–F are illustrated in Table III which presents conventional Performance Standard Units (PSU) for stained clothings samples after passing through a typical wash cycle. The clothing articles are washed using a conventional detergent during which 1554 ppm of samples A–F are added to the washing solution. The samples are compared to similar clothes only washed with a conventional detergent without bleach. Panelists are asked to compare the clothes washed with the liquid bleach with those clothes washed without bleach and assign grades according to the following scale:

0=no difference between two samples
1=think there is a difference
2=know there is a little difference
3=know there is a lot of difference
4=know there is a whole lot of difference Each panelist graded the samples under standard lighting. Prior to the washing cycle, each of samples A–F is stored for 2 weeks at 38° C. (100° F.).

TABLE III

| Stain | Detergent w/o bleach | A | B | C | D | E | F |
|---|---|---|---|---|---|---|---|
| Grass (cotton) | 0 | 2.90 | 2.14 | 2.46 | 3.62 | 2.66 | 2.13 |
| Grass (blend) | 0 | 2.39 | 2.34 | 2.46 | 3.28 | 2.99 | 2.09 |
| Grass Average | 0 | 2.65 | 2.24 | 2.46 | 3.45 | 2.83 | 2.11 |
| Spaghetti | 0 | 2.24 | 2.38 | 2.68 | 3.92 | 2.88 | 2.12 |
| B-carotene | 0 | 3.19 | 2.06 | 3.52 | 4.59 | 4.23 | 2.63 |
| Tea | 0 | 2.81 | 3.39 | 3.13 | 2.14 | 3.70 | 2.22 |
| Clay | 0 | 0.61 | N/A | N/A | N/A | 0.33 | 0.39 |
| Stain Average | 0 | 2.72 | 2.52 | 2.95 | 3.53 | 3.41 | 2.27 |

As can be seen in Table III, the efficacy of samples A–F is substantially better than the control which comprises detergent without a bleach.

Having thus described the invention in detail, it will be obvious to those skilled in the an that various changes may be made without departing from the scope of the invention and the invention is not to be considered limited to what is described in the specification.

What is claimed is:

1. A method of laundering soiled clothes comprising the steps of contacting said clothes with an effective amount of a detergent compositions and further contacting said clothes with an effective amount of a stable aqueous liquid bleach composition comprising:

(a) from about 1% to about 25% by weight of a water-soluble bleach activator;
(b) from about 0.1% to about 10% by weight of hydrogen peroxide;
(c) from about 1% to about 20% by weight of a nonionic surfactant phase stabilizer;
(d) from about 0.001% to about 2% by weight of a chelating agent; and
(e) the balance water;

wherein said liquid bleach composition is isotropic, translucent, has a pH of from about 3 to about 5, and has a viscosity of less than about 500 cps.

2. A stable aqueous liquid bleach composition comprising:

(a) from about 1% to about 25% by weight of a water-soluble bleach activator;
(b) from about 0.1% to about 10% by weight of hydrogen peroxide;
(c) from about 1% to about 20% by weight of a nonionic surfactant phase stabilizer;
(d) from about 0.001% to about 2% by weight of a chelating agent; and
(e) the balance water;

wherein said liquid bleach composition is isotropic, translucent, has a pH of from about 3 to about 5, and has a viscosity of less than about 500 cps.

3. The liquid bleach composition of claim 2 wherein said bleach activator has the formula

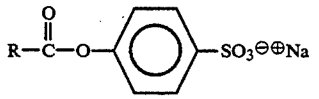

wherein R is an alkyl chain containing from 1 to 11 carbon atoms.

4. The liquid bleach composition of claim 2 wherein said bleach activator has the formula

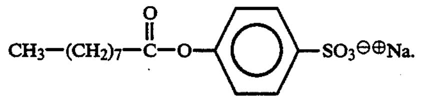

5. The liquid bleach composition of claim 2 wherein said composition has a pH in a range from about 3.5 to about 4.5.

6. The liquid bleach composition of claim 2 wherein said viscosity is in a range from about 10 cps to about 100 cps.

7. The liquid bleach composition of claim 2 wherein said chelating agent is selected from the group consisting of ethylhydroxydiphosphonate, 2,6-pyridinedicarboxylic acid, citric acid and mixtures thereof.

8. The liquid bleach composition of claim 2 wherein said composition comprises (a) from about 3% to about 12% by weight of said water-soluble bleach activator;
(b) from about 0.3% to about 7% by weight of said hydrogen peroxide;
(c) from about 5% to about 15% by weight of said nonionic surfactant;
(d) from about 0.05% to about 1% by weight of said chelating agent; and
(e) the balance water.

9. The liquid bleach composition of claim 2 wherein said composition comprises
(a) from about 5% to about 10% by weight of said water-soluble bleach activator;
(b) from about 0.5% to about 5% by weight of said hydrogen peroxide;
(c) from about 7% to about 10% by weight of said nonionic surfactant;
(d) from about 0.1% to about 0.8% by weight of said chelating agent; and
(e) the balance water.

10. The liquid bleach composition of claim 2 wherein said phase stabilizer is an alkyl ethoxylate having from about 9 to 11 carbon atoms and an average degree of ethoxylation of about 10.

11. The liquid bleach composition of claim 2 wherein the ratio of said bleach activator to said hydrogen peroxide is in a range from about 15:1 to about 1:2.

12. The liquid bleach composition of claim 2 wherein the ratio of said bleach activator to said hydrogen peroxide is in a range from about 10:1 to about 1: 1.

13. The liquid bleach composition of claim 2 wherein said bleach activator has the general formula

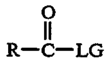

wherein R is an alkyl group containing from about 1 to 11 carbon atoms, and LG is a leaving group, the conjugate acid of which has a $pK_a$ of from about 4 to about 13.

14. The liquid bleach composition of claim 13 wherein LG has the formula

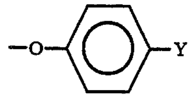

wherein Y is selected from the group consisting of $SO_3^-M^+$, $SO_4^-M^+$, $PO_4^-M^+$, $PO_3^-M^+$, $(N^+R_3^2)X^-$ and $O \leftarrow N(R_2^2)$, M is a cation, X is an anion, and $R^2$ is selected from the group consisting of hydrogen and an alkyl chain containing 1 to 4 carbon atoms.

* * * * *

UNITED STATES PATENT AND TRADEMARK OFFICE

CERTIFICATE OF CORRECTION

PATENT NO. : 5,419,847

DATED : May 30, 1995

INVENTOR(S) : Michael S. Showell, et al.

It is certified that error appears in the above-indentified patent and that said Letters Patent is hereby corrected as shown below:

Column 1, line 40, "In the past, ninny ..." should read --In the past, many--.

Column 2, line 56, "... off ..." should read --of a--.

Column 4, line 54, "... $(N^+R_3{}^2)X^-$ and $O \leftarrow N(R_2{}^2)$ ..." should read --$(N^+R^2{}_3)X^-$ and $O \leftarrow N(R^2{}_2)$--.

Column 6, line 9, "... in pan ..." should read --in part--.

Column 7, line 32, "... 2 lo ..." should read --2 to--.

Column 9, line 61, "an" should read --art--

Column 12, line 20, "... $(N^+R_3{}^2)X^-$ and $O \leftarrow N(R_2{}^2)$ ..." should read --$(N^+R^2{}_3)X^-$ and $O \leftarrow N(R^2{}_2)$--.

Signed and Sealed this

Tenth Day of October, 1995

Attest:

Bruce Lehman

BRUCE LEHMAN

*Attesting Officer* *Commissioner of Patents and Trademarks*